United States Patent
Bauer et al.

[15] 3,678,062
[45] July 18, 1972

[54] CERTAIN 4-/(INDAZOL-3-YL)-PYRIDINIUM/COMPOUNDS

[72] Inventors: Victor John Bauer, Montvale, N.J.; William Joseph Fanshawe; Gretchen Ellen Wiegand, both of Pearl River, N.Y.

[73] Assignee: American Cyanamid Company, Stamford, Conn.

[22] Filed: Sept. 8, 1970

[21] Appl. No.: 70,573

[52] U.S. Cl. .......................260/296 B, 260/297 B, 424/263
[51] Int. Cl. ........................................................C07d 31/42
[58] Field of Search................................................260/296 B

[56] References Cited

UNITED STATES PATENTS 3,574,842  4/1971  Bauer et al. .........................260/296 R
3,598,829  10/1971  Bauer et al. .........................260/296 R

*Primary Examiner*—Alan L. Rotman
*Attorney*—Ernest Y. Miller

[57] ABSTRACT

Quaternary pyridinium salts are prepared by quaternizing the corresponding pyridine compounds which in turn are prepared by various methods. The quaternary salts are useful for lowering blood glucose in warm-blooded animals.

3 Claims, No Drawings

CERTAIN 4-/(INDAZOL-3-YL)-PYRIDINIUM/COMPOUNDS

DESCRIPTION OF THE INVENTION

This invention relates to new organic compounds; more particularly, it relates to quaternary pyridinium salts, intermediates for preparation of the salts, and methods of preparing the same.

The new compounds of the present invention may be illustrated by the following formula:

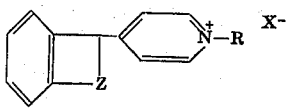

wherein R is lower alkyl; Z is a trivalent radical selected from the group consisting of

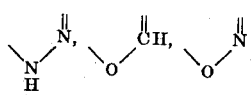

and X is a monovalent pharmaceutically acceptable anion. Lower alkyl groups are those having one to four carbons such as for example, methyl, ethyl, propyl, isopropyl, butyl or isobutyl. Monovalent pharmaceutically acceptable anions include chloride, bromide, iodide, fluoride, etc.

The compounds of the present invention may be prepared by quaternization of an appropriate pyridine base with, for example, a lower alkyl halide at a temperature of 0 to 150° C., with or without a solvent such as alcohol, for a time of 1 minute to 24 hours in an open vessel or a sealed bomb. The desired pyridylindazole is prepared by dehydrogenation of the known tetrahydro-compound. The requisite pyridylbenzisoxazole is prepared by reaction of hydroxylamine and o-chlorophenyl pyridyl ketone. The requisite pyridylbenzofuran is prepared by reaction of a benzofuranone with pyridyllithium, followed by dehydration of the intermediate alcohol. These reactions are illustrated schematically immediately below:

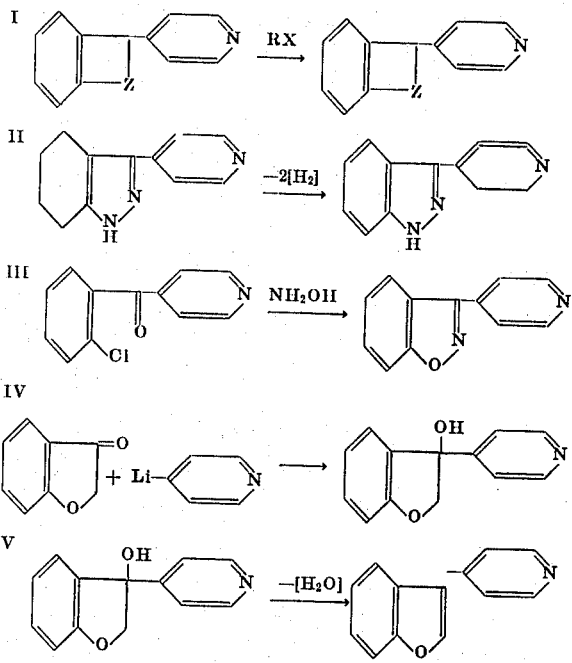

wherein R, Z and X are as defined above.

The intermediate pyridine bases before quaternization are novel compounds and are considered to be a part of the present invention. They may be illustrated by the following formula:

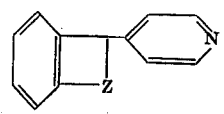

wherein Z is as defined above.

Among the compounds of the present invention are, for example: 4-(4-pyridyl)indazole, 3-(4-pyridyl)-1,2-benzisoxazole, 3-(4-pyridyl)benzofuran, 1-methyl-4-(3-indazolyl)pyridinium iodide, 1-propyl-4-(3-indazolyl)pyridinium bromide, 1-methyl-4-(1,2-benzisoxazol-3-yl)pyridinium iodide, 1-ethyl-4-(1,2-benzisoxazol-3-yl)pyridinium chloride, 1-methyl-4-(3-benzofuranyl)-pyridinium chloride, 1-butyl-4-(3-benzofuranyl)pyridinium bromide, and the like.

The compounds of the present invention show hypoglycemic activity based on the following data which shows a reduction of the blood sugar levels in warm-blooded animals such as mice. When the compounds are administered orally to normal mice, a reduction of blood sugar levels is observed. Mice used in these studies are CF-1 (Carworth Farms, 25–30 grams). The quaternary salts of this invention are administered by gavage as 0.5 percent carboxymethylcellulose suspensions; control animals receive an equivalent volume of vehicle. Food is withheld from animals after dosing. Blood glucose is determined 5 hours after dosing, on blood samples obtained from the retrobulbar plexuses of mice, by the method of Hoffman [J. Biol. Chem., 120, 51 (1937)] as adapted to the Technicon AutoAnalyzer and is expressed as percent change from predose values. The testing data is summarized in Table I. Comparable data for the antidiabetic drugs phenformin and tolbutamide are also presented.

TABLE I

Decrease in Blood Glucose in Normal Mice After Oral Administration of Quaternary Pyridinium Salts

| Compound | Dose mmols/kg. | Hours after dosing | Percent Decrease in Blood Glucose |
|---|---|---|---|
| 1-Methyl-4-(3-indazolyl)-pyridinuum Iodide | 1.5 | 5 | 54 ± 4 |
| 1-Methyl-4-(1,2-benziso-xazol-3-yl)pyridinium Iodide | 3.0 | 5 | 63 ± 11 |
| 1-Methyl-4-(3-benzofur-anyl)pyridinium Iodide | 0.5 | 5 | 52 ± 5 |
| Phenformin | 1.6 | 5 | 49 ± 6 |
| Tolbutamide | 3.0 | 5 | 41 ± 5 |

These results show that the compounds of the present invention are useful, as are tolbutamide and phenformin, in the lowering of blood glucose levels in warm-blooded animals. Their effectiveness is comparable to that seen with phenformin and tolbutamide. The present compounds may be orally administered at a dose of 1 mg. to 200 mg. per kg. of body weight per day.

SPECIFIC DISCLOSURE

The preparation of the compounds of this invention will be described in greater detail in conjunction with the following examples.

EXAMPLE 1

Preparation of 3-(4-Pyridyl)indazole

A stirred mixture of 1.0 g. of 3-(4-pyridyl)-4,5,6,7-tetrahydroindazole [J. Med. Chem., 11, 981 (1968)], 0.2 g. of 10 percent palladium-on-carbon, and 40 ml. of diphenyl ether is heated under reflux under nitrogen for 7 hours, filtered, diluted with chloroform, and extracted with 6N hydrochloric acid. The aqueous phase is made basic with sodium hydroxide and extracted with chloroform. The chloroform solution is dried and concentrated to a solid. Recrystallization from acetonitrile provides offwhite crystals, melting point 174°–180 °C.

EXAMPLE 2

Preparation of 1-Methyl-4-(3-indazolyl)pyridinium Iodide

A solution of 2.0 g. of 3-(4-pyridyl)indazole, 5 ml. of methyl iodide, and 30 ml. of ethanol is heated under reflux for 2 hours, cooled, and filtered. The collected solid is recrystallized from methanol to provide yellow crystals, melting point 275°–278° C.

EXAMPLE 3

Preparation of 3-(4-Pyridyl)-1,2-benzisoxazole

To a stirred solution of 6.4 g. of 4-(o-chlorobenzoyl)-pyridine, 4.4 g. of hydroxylamine hydrochloride, 100 ml. of methyl cellosolve, and 60 ml. of water is added a solution of 18.5 g. of potassium hydroxide in 40 ml. of water. The solution is heated under reflux for 10 hours, cooled, diluted with water, and filtered. The collected solid is washed with water and dried to provide off-white solid, melting point 74°–76° C.

EXAMPLE 4

Preparation of 1-Methyl-4-(1,2-benzisoxazol-3-yl)pyridinium Iodide

A solution of 1.2 g. of 3-(4-pyridyl)-1,2-benzisoxazole, 3.65 g. of methyl iodide, and 3.6 ml. of dimethylformamide is warmed briefly on a steam bath, cooled, diluted with ether, and filtered. The collected solid is dissolved in methanol and reprecipitated with ether to provide an orange solid, melting point 267°–269° C., dec.

EXAMPLE 5

Preparation of 2,3-Dihydro-3-(4-pyridyl)-3-benzofuranol

A solution of 4.2 g. of benzofuran-3(2H)-one in 100 ml. of ether is added dropwise at −30° C. to a stirred solution of 0.05 mol. of 4-pyridyllithium in 200 ml. of ether. After 5 hours, the mixture is decomposed with 63 ml. of 3N hydrochloric acid, made basic with ammonium hydroxide, and extracted with chloroform. The chloroform solution is dried and concentrated to an oily solid. Sublimation at 135° C. (0.05 mm.) gives yellow solid, melting point 184°–186° C.

EXAMPLE 6

Preparation of 3-(4-Pyridyl)benzofuran

A mixture of 0.42 g. of 2,3-dihydro-3-(4-pyridyl)-4-benzofuranol and 0.1 g. of potassium bisulfate is fused at 190° C. for 15 minutes, cooled, diluted with excess aqueous sodium hydroxide, and extracted with chloroform. The chloroform solution is dried and concentrated to a yellow oil. The product forms a crystalline hydrochloride salt, melting point 210–211° C.

EXAMPLE 7

Preparation of 1-Methyl-4-(3-benzofuranyl)pyridinium Iodide

A solution of 3.0 g. of 3-(4-pyridyl)benzofuran, 10 ml. of methyl iodide, and 35 ml. of ethanol is heated under reflux for 30 minutes, cooled, diluted with ether, and filtered. Recrystallization of the collected solid from ethanol gives yellow crystals, melting point 241°–243° C.

EXAMPLE 8

Preparation of 50 mg. Tablets

| | |
|---|---|
| 1-methyl-4-(1,2-benzisoxazol-3-yl)pyridinium iodide | 250.0 g. |
| Lactose | 400. g. |
| Corn Starch (For mix) | 50. g. |
| Corn Starch (For paste) | 37.5 g. |
| | 737.5 |
| Magnesium stearate (1%) | 7.5 g. |
| | 745.0 g. |

The active ingredient, lactose and corn starch (for mix) are blended together. The corn starch (for paste) is suspended in 300 ml. of water, and heated with stirring, to form a paste. This paste is then used to granulate the mixed powders. Additional water is sued, if necessary. The wet granules are passed through a No. 8 hand screen and dried at 120° F. The dry granules are passed through a No. 16 screen. The mixture is lubricated with 1 percent magnesium stearate and compressed into tablets in a suitable tableting machine.

EXAMPLE 9

Preparation of 25 mg. Capsules

| | For 10,000 Capsule |
|---|---|
| 1-methyl-4-(3-indazolyl)-pyridinium iodide | 250.0 g. |
| Lactose, U.S.P. | 5000 g. |
| Magnesium Stearate (0.5%) | 350.0 g. |
| total: | 5600 g. |

The formulation is thoroughly mixed and placed as equal quantities in 10,000 hard shell capsules or soft shell capsules. Each capsule contains 25 mg. of drug.

EXAMPLE 10

Preparation of drug solution

| | |
|---|---|
| 1-methyl-4-(3-benzofuranyl)-pyridinium iodide | 5 g. |
| Sodium carboxymethylcellulose 5% aqueous solution q.s. | 100 cc. |

The above solution contains approximately 50 mg. per cc. of finished product.

We claim:

1. A pyridine compound of the formula:

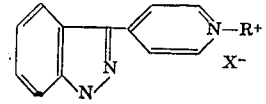

wherein R⁺ is lower alkyl and X⁻ is a monovalent pharmaceutically acceptable anion.

2. The pyridine compound in accordance with claim 1, 1-methyl-4-(3-indazolyl)pyridinium iodide.

3. The pyridine compound in accordance with claim 1, 3-(4-pyridyl)indazole.

* * * * *